United States Patent [19]

Lethellier

[11] Patent Number: 4,595,974
[45] Date of Patent: Jun. 17, 1986

[54] BASE DRIVE CIRCUIT FOR A SWITCHING POWER TRANSISTOR

[75] Inventor: Patrice R. Lethellier, Tamarac, Fla.

[73] Assignee: Burroughs Corporation, Detroit, Mich.

[21] Appl. No.: 649,071

[22] Filed: Sep. 10, 1984

[51] Int. Cl.$^4$ ........................................... H02M 3/335
[52] U.S. Cl. ...................................... 363/21; 363/41; 363/97; 323/289; 307/297
[58] Field of Search .................. 363/21, 41, 95, 97, 363/98; 323/288, 289; 3.7/296 R, 297

[56] References Cited

U.S. PATENT DOCUMENTS

| | | | |
|---|---|---|---|
| 4,063,307 | 12/1977 | Stephens | 363/21 |
| 4,253,136 | 2/1981 | Nanko | 363/21 |
| 4,315,303 | 2/1982 | Snyder | 363/21 |
| 4,342,956 | 8/1982 | Archer | 323/289 |
| 4,353,112 | 10/1982 | Rietveld et al. | 363/97 X |
| 4,454,573 | 6/1984 | Petsch et al. | 363/98 |
| 4,481,504 | 11/1984 | Balaban | 363/21 |
| 4,481,565 | 11/1984 | Colton | 363/21 X |

Primary Examiner—Philip H. Leung
Attorney, Agent, or Firm—Robert A. Green; Kevin R. Peterson; Francis A. Varallo

[57] ABSTRACT

A circuit for controlling the base drive of switching transistor in a power supply wherein the switching transistor is coupled to the primary winding of a transformer linking the primary and secondary circuits of the power supply. Optimum operation of the switching transistor implies a desired level of saturation thereof. Base drive for the switching transistor is provided by a second conducting transistor. An excess of current flowing in the switching transistor is sensed, thereby effecting a reduction in the current flow in the second transistor. The latter condition causes a diminution in the base drive of the switching transistor and a return to its desired level of saturation.

11 Claims, 2 Drawing Figures

BASE DRIVE CIRCUIT FOR A SWITCHING POWER TRANSISTOR

BACKGROUND OF THE INVENTION

Many types of present day power supplies employ a transformer having a primary winding which receives an alternating current from a semiconductor power switching device. The transformer also has a secondary winding coupled to rectifying and filtering circuitry for delivering one or more D.C. voltages to a load. When such a power supply includes a high voltage, high speed switching transistor, it is necessary to accurately control the turn-on and turn-off of the transistor for optimum operation. To be operated near its rating, a high voltage fast-acting transistor needs a highly controlled base drive, and the saturation of the transistor must be controlled. If the transistor is not saturated enough, there are conduction losses, and, if it is saturated too much, there are excess charges in the base which must be removed to turn off the device.

The prior art provides no completely satisfactory circuit for operating a power switching transistor to obtain optimum operation and to avoid the problems described above.

The present invention provides a circuit for achieving optimum control of the base current of a power transistor in a power supply and for thereby achieving fast turn-on and turn-off of the transistor.

DESCRIPTION OF THE INVENTION

Figure 1:
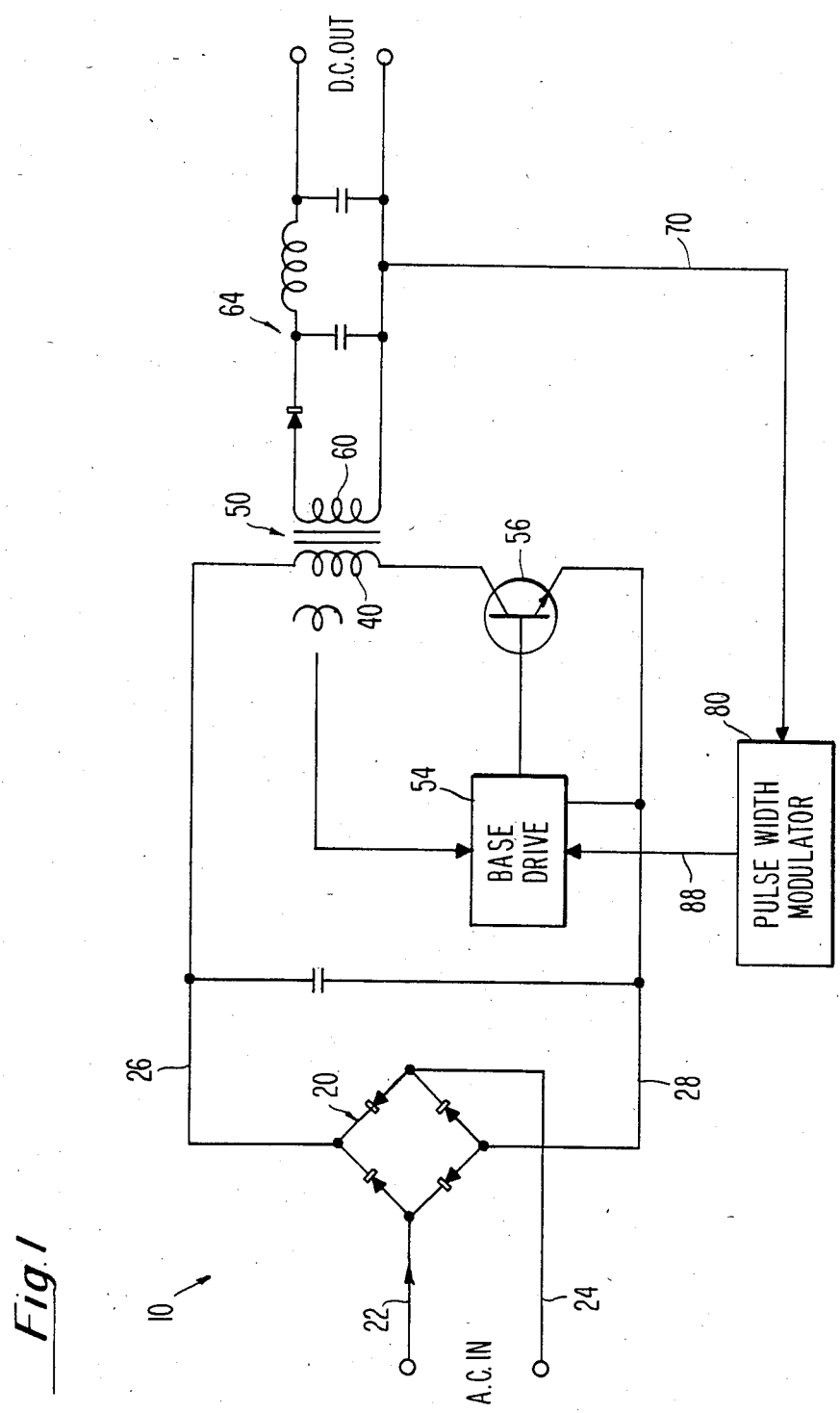
FIG. 1 is a schematic representation, partly in block diagram, of a power supply embodying the invention.

The power supply of the invention 10, shown in FIG. 1, has the conventional 110 volt, 60 cycle A.C. supply coupled to two opposite corners of a rectifier bridge 20 by leads 22 and 24, and leads 26 and 28 are connected to the opposite two corners between which high voltage output appears. The primary winding 40 of a transformer 50 is connected in series with a power switching NPN transistor 56 between leads 26 and 28. The secondary winding 60 of the transformer 50 is coupled to a secondary circuit 64 which provides the D.C. output of the system 10 and includes various filtering arrangements and the like, as is well known in the art, and a feedback lead 70 is coupled from the secondary circuit 64 through a control circuit 80, which is a pulse width modulator, to the input of a base drive circuit 54 for the transistor 56. Circuit 80 produces a waveform comprising positive and negative generally rectangular pulses.

Figure 2:
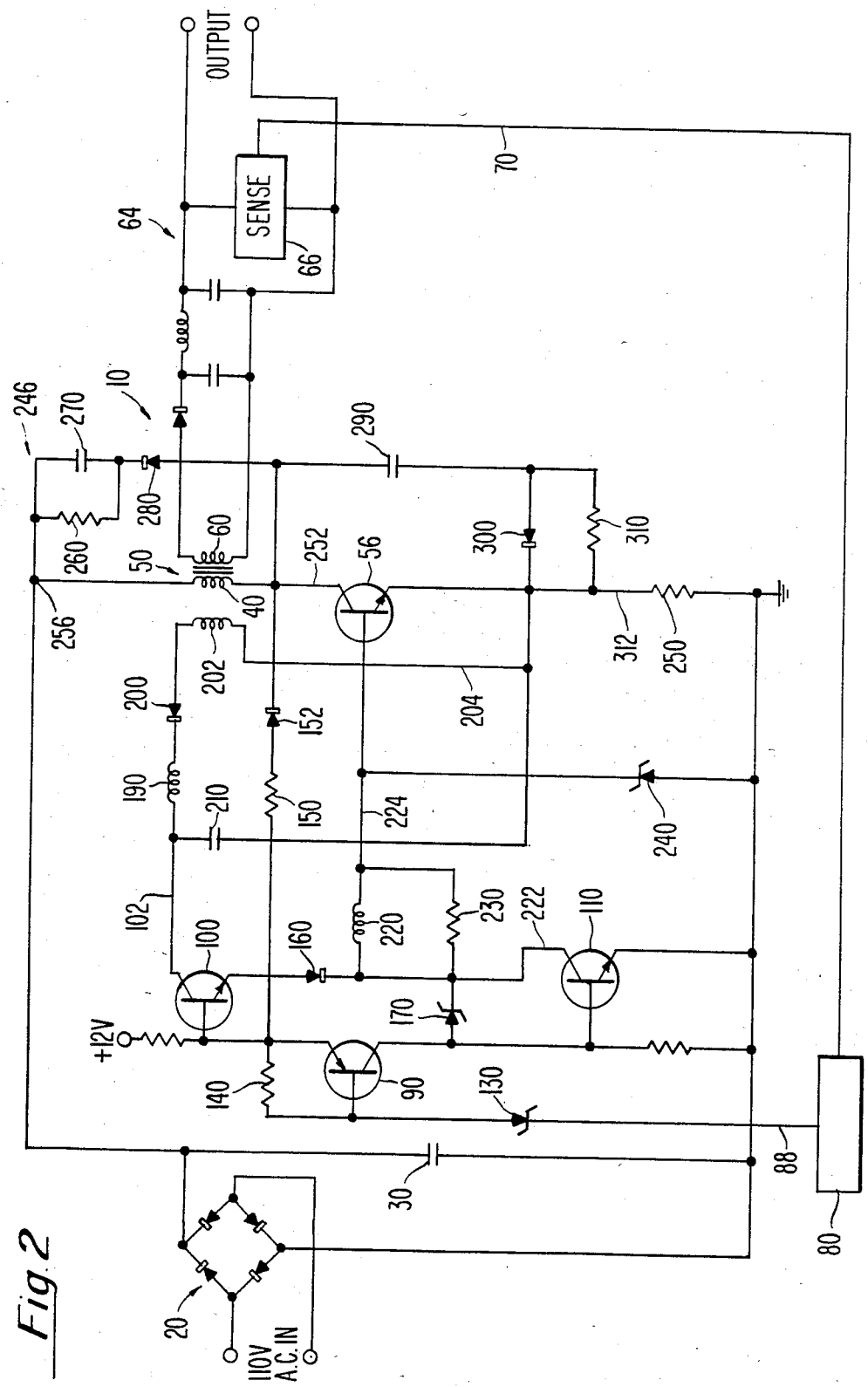
FIG. 2 is a detailed schematic representation of the circuit of FIG. 1.

The system of FIG. 1 is shown in greater detail in FIG. 2 and includes, in base drive module 54, three transistors 90 (PNP), 100 (NPN), and 110 (NPN) connected to drive NPN switching power transistor 56. The logic input line 88 from the control circuit 80 is coupled to the cathode of a diode 130, the anode of which is connected (1) to the base of transistor 90 and (2) through resistors 140 and 150 and through diode 152 to the collector of power transistor 56. A small bias voltage (about 12 V) is coupled through a resistive path to the base of transistor 100 and to the emitter of transistor 90. The collector of transistor 90 is coupled to ground and to the base of transistor 110. The emitter of transistor 100 is connected through diode 160 to the collector of transistor 110, and the emitter of transistor 110 is connected to ground. The collectors of transistors 90 and 110 are interconnected by diode 170.

The collector of transistor 100 is coupled by lead 102 through an inductor 190 and diode 200 to one end of an auxiliary transformer winding 202, the other end of which is connected to lead 204 which is connected (1) through capacitor 210 to lead 102, and (2) to the emitter of transistor 56. The collector of transistor 100 is thus also coupled through capacitor 210 to the other end of the auxiliary winding 202 and to the emitter of transistor 56.

Inductor or choke 220 is connected from lead 222 and by lead 224 to the base of transistor 56 and through resistor 230 to the lead 222 to the collector of transistor 110. Lead 224 is also coupled through diode 240 to ground.

The emitter of transistor 56 is connected to lead 204 and through resistor 250 to ground. The collector of transistor 56 is connected to lead 252 and through the primary winding 40 of transformer 50 to lead 254 which runs to a high voltage terminal 256.

A protective network 246 is connected across primary winding 40 and switching transistor 56. This network includes a parallel circuit of resistor 260 and capacitor 270 connected in series with diode 280 and capacitor 290 to the parallel combination of diode 300 and resistor 310 to lead 312 and thus to the emitter of transistor 56. The protective network protects the transistor 56 against high voltage spikes, and the lower portion of the protective network helps maintain the emitter of transistor 56 positive during switching.

The secondary circuit 64 of the power supply 10 includes filtering and smoothing networks and a circuit 66 for sensing deviations from the desired output voltage and means for coupling positive or negative correction signals to the control circuit 80. The sensing circuit may be an optical feedback arrangement whose light output is proportional to the deviation in sensed voltage.

Briefly, in operation of the power supply 10, the input A.C. 110 volt line voltage is rectified and smoothed, and then the current is switched to a higher frequency, about 25 KHz, by the switching transistor 56 under the control of pulse-generating circuit 80. After the current is modified and isolated by transformer 50, the current is rectified and smoothed in the secondary network 64 to provide a regulated D.C. output of a desired voltage. Voltage sensing and comparing circuit 66 in the secondary network senses the magnitude of the output voltage, and, if there is a deviation from a desired voltage, an error correction signal is coupled back through circuit 80 to the switching transistor to properly modify its output to thereby correct the output to the desired level.

Considering the operation of the invention in greater detail, the pulse width modulator provides, on lead 88, a signal made up of positive and negative pulses. Assume that transistor 56 had just turned off; when the next positive pulse out of modulator 80 appears on lead 88, it is coupled through diode 130 to the base of transistor 90 which had been on but now turns off. Without current flow through transistor 90 to the base of transistor 110, transistor 110 which had been on now turns off. Also, with transistor 90 turned off and not drawing base current from transistor 100 which had been off, transistor 100 now turns on and provides a current flow path to the base of switching transistor 56.

With transistor 100 turned off, current flows from capacitor 210 through transistor 100, diode 160, and inductor 220 into the base of transistor 56 which turns on. When transistor 56 turns on, a voltage pulse appears across the primary winding 40 of transformer 50. The resultant current flow through primary winding 40 is coupled to the secondary winding 60, and the desired output voltage is generated at the output of the power supply by the secondary circuit 64. When the output of the pulse width modulator module 80 provides a negative pulse on lead 88, transistor 90 turns on, transistor 110 turns on, and transistor 100 turns off and transistor 56 turns off.

With each of the pulses supplied by the modulator circuit 80, the functions described above are repeated, and switching transistor 56 is alternately turned on and off. This is the normal operation of the power supply 10 if there is no deviation from the desired output voltage. At the output of the power supply in the secondary circuit 64, the output voltage is compared with the desired output voltage by the sensing circuit 66, and, if the output voltage deviates from the desired voltage, a positive or negative correction signal is coupled back to the pulse width modulator 80 to modulate its duty cycle. This action similarly modulates the output current and/or the duty cycle of the switching transistor 56 to provide adjustment of the D.C. output voltage to the desired magnitude.

Some of the features of the operation of the system 10 are as follows:

1. At turn-on of transistor 56, transistor 100 acts as a current generator and generates the initial positive-going portion of the base current of transistor 56, and, when transistor 56 turns off, the base current is shorted to ground, with the negative slope of the turn-off being controlled by choke 220.

2. While transistor 56 is conducting, its base current is provided through the auxiliary transformer winding 202 acting through the same path as above. This improves the efficiency of the circuit since this winding is a low voltage winding and losses are minimal. During the "on" time of transistor 56, capacitor 210 charges again for the next cycle.

3. The base current of switching transistor 56 is regulated as follows to control its saturation. If transistor 56 is too high and it tends to be too saturated, its collector voltage is too low, and this causes the current through resistor 150 and diode 152 to increase. When this happens, part of the base current of transistor 100 flows through resistor 150 and diode 152, and this causes the base current of transistor 56 to decrease. This adjusts the base current of transistor 56 to the desired level as determined by its characteristics. This regulation takes place automatically even when transistors 56 are replaced during operation of the system 10.

4. To optimize the response time of transistor 56, it is kept just at the limit of saturation, and this is done by keeping the stored charge small, by passing through resistor 150 and diode 152 part of the base current of transistor 100.

5. During the storage time of transistor 100, transistor 110 diverts to ground, the current coming from transistor 100 and the reverse current from the base of transistor 56. This current is due to excess charges which accumulate in the base junction of transistor 56 during the transistor's on time. It is possible to have reverse current because, during switching, the emitter of transistor 56 is kept slightly positive because of the current through the transistor and because of the action of the protective networks. With transistor 100 off, the only current through transistor 110 is the reverse current from the base of transistor 56.

6. It is noted that transistor 100 does not turn off at once, and, during the storage time of transistor 100, transistor 110 absorbs the reverse base current of transistor 56 and the current which was generated by transistor 100.

7. Diode 170 is a small Schottky diode which reduces the storage time of transistor 110 by keeping it at the limit of saturation and by minimizing its stored charge.

8. When transistor 56 turns off, there is no activity in the circuit, except that transistor 110 leads to ground the small leakage current of the collector base junction of transistor 56. This permits maximum voltage breakdown for transistor 56 when it turns on.

What is claimed is:

1. A base drive circuit for use in a switching-type power supply comprising:

first and second transistors each having an emitter, a collector and a base electrode, the base electrode of said first transistor being coupled to the emitter electrode of said second transistor via a first current path, the base electrode of said second transistor being coupled to a bias voltage source, the collector electrode of said first transistor being coupled to said base electrode of said second transistor via a second current path, means coupled to said second transistor for causing said last mentioned transistor to selectively assume a conducting and nonconducting state, said first transistor being responsive to the state of conduction of said second transistor whereby said first transistor is caused to assume a like state of conduction, the conduction of said second transistor causing current flow via said first current path to the base of said first transistor thereby determining the degree of conduction of said first transistor, said second current path including a unidirectional current conducting device poled to permit current to flow in said last mentioned path when the potential on the collector electrode of said first transistor falls below a predetermined value consistent with the desired level of saturation current in said first transistor, the current flow in said second current path effecting a diminution of said current flow in said first current path thereby reducing the current flow in said first transistor to said desired level.

2. A base drive circuit as defined in claim 1 wherein said first current path includes an inductor and a diode connected in series relationship.

3. A base drive circuit as defined in claim 2 wherein said second current path further includes a resistor connected in series with said unidirectional current conducting device, said base of said second transistor being coupled to said bias voltage source by a resistor.

4. A base drive circuit as defined in claim 3 further including a voltage source having a high potential terminal and a reference potential terminal, transformer means having at least a primary winding, a secondary winding and an auxiliary winding, the collector electrode of said first transistor being coupled to said high potential terminal via said primary winding, and the emitter electrode of said first transistor being coupled to said reference potential terminal.

5. A base drive circuit as defined in claim 4 further including local dc generator means for supplying current to said second transistor, said generator means being coupled between the collector electrode of said second transistor and the emitter electrode of said first transistor, said generator means comprising a circuit having a pair of parallel branches, a first of said branches including in series said auxiliary winding, a diode and an inductor, and the second of said branches including a capacitor.

6. A base drive circuit as defined in claim 5 wherein said means for causing said second transistor to selectively assume a conducting and nonconducting state include a third and fourth transistor each having an emitter, a collector and a base electrode, the emitter electrode of said third transistor being coupled to the base of said second transistor, the collector electrode of said third transistor being coupled to the base electrode of said fourth transistor, the emitter electrode of said fourth transistor being coupled to said reference potential terminal, the collector electrode of said fourth transistor being connected to the common junction of said series connected diode and inductor in said first current path, resistive means coupling the emitter electrode of said third transistor to the base electrode thereof, the base electrode of said fourth transistor being coupled to said reference potential terminal, means for applying signals to the base of said third transistor for causing said last mentioned transistor to assume respective conducting and nonconducting states, the attainment of a given state by said third transistor causing said fourth transistor to assume a like state, and said first and said second transistor to assume an opposite state.

7. A base drive circuit as defined in claim 6 further including a third current path coupling the base electrode of said first transistor to the collector electrode of said fourth transistor, said third current path being effective upon the cessation of conduction of said first transistor for permitting the reverse current due to excess charges in the base junction of the latter transistor to flow through said fourth transistor which is in a conducting state.

8. A base drive circuit as defined in claim 7 wherein said third current path includes the parallel combination of said inductor in said first current path and a resistor.

9. A base drive circuit as defined in claim 8 further including a Schottky diode connected between the respective collector electrodes of said third and fourth transistors for reducing the storage time of said fourth transistor.

10. A base drive circuit as defined in claim 9 wherein said signals applied to the base electrode of said third transistor are a train of alternating positive and negative voltage pulses.

11. A base drive circuit as defined in claim 10 characterized in that said third transistor is of the PNP conductivity type, and that said first, second and fourth transistors are of the NPN type.

* * * * *